United States Patent
Qi et al.

(10) Patent No.: US 10,599,564 B2
(45) Date of Patent: Mar. 24, 2020

(54) RESOURCE RECLAMATION METHOD AND APPARATUS

(71) Applicant: ALIBABA GROUP HOLDING LIMITED, George Town, Grand Cayman (KY)

(72) Inventors: Yumin Qi, Salinas, CA (US); Sanhong Li, Hangzhou (CN); Chuansheng Lu, Hangzhou (CN); Jianho Mo, Hangzhou (CN); Tongbao Zhang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/896,962

(22) Filed: Feb. 14, 2018

(65) Prior Publication Data

US 2018/0239699 A1    Aug. 23, 2018

(30) Foreign Application Priority Data

Feb. 20, 2017   (CN) .......................... 2017 1 0090482

(51) Int. Cl.
*G06F 12/02* (2006.01)
*G06F 9/455* (2018.01)
*G06F 9/50* (2006.01)

(52) U.S. Cl.
CPC ...... *G06F 12/0276* (2013.01); *G06F 12/0284* (2013.01); *G06F 9/45504* (2013.01); *G06F 9/5016* (2013.01); *G06F 9/5022* (2013.01); *G06F 12/023* (2013.01); *G06F 2212/1024* (2013.01)

(58) Field of Classification Search
CPC .. G06F 9/45504; G06F 9/5016; G06F 9/5022; G06F 12/023; G06F 12/0276; G06F 12/0284; G06F 2009/45583; G06F 2212/1024

See application file for complete search history.

(56) References Cited

U.S. PATENT DOCUMENTS

| | | | |
|---|---|---|---|
| 6,049,810 A * | 4/2000 | Schwartz | G06F 12/0276 |
| 2002/0091904 A1 * | 7/2002 | Haggar | G06F 12/023 |
| | | | 711/170 |
| 2004/0168030 A1 | 8/2004 | Traversat et al. | |
| 2009/0228537 A1 * | 9/2009 | Branda | G06F 12/0261 |
| 2011/0219204 A1 | 9/2011 | Caspole | |
| 2015/0100752 A1 | 4/2015 | Flood | |

OTHER PUBLICATIONS

PCT International Search Report and Written Opinion of the International Searching Authority issued in International Application No. PCT/US18/18215; dated Apr. 26, 2018 (9 pgs.).

* cited by examiner

*Primary Examiner* — Aracelis Ruiz
(74) *Attorney, Agent, or Firm* — Finnegan, Henderson, Farabow, Garrett & Dunner, LLP

(57) ABSTRACT

Embodiments of the application provide a resource reclamation method and a resource reclamation apparatus. The method includes: determining a memory region corresponding to a target tenant included by a heap memory as a target region; and performing resource reclamation on the target region to release the target region.

15 Claims, 13 Drawing Sheets

RESOURCE RECLAMATION METHOD AND APPARATUS

CROSS REFERENCE TO RELATED APPLICATION

The disclosure claims the benefits of priority to Chinese Application No. 201710090482.8, filed Feb. 20, 2017, which is incorporated herein by reference in its entirety.

BACKGROUND

When an object-oriented program runs, a function thereof may be implemented by created objects, and each created object may occupy certain memory resources. When a certain object is no longer needed, the object may be cleared to release the memory resources occupied by the object. This process may be referred to as a Garbage Collection (GC) process.

By taking a Java™ Virtual Machine (JVM) as an example, objects of all applications deployed in a same JVM are all stored in a Java Heap of the memory (heap memory). When garbage collection is performed on the Java heap, the JVM may suspend threads of application programs except a program that executes the garbage collection operation, and then garbage collection is performed on the whole heap memory to release memory space occupied by unavailable objects.

In the process of garbage collection, the running of programs, except the program that executes the garbage collection operation, is suspended. Therefore, the programs in the JVM cannot provide external services. For some application programs written in languages other than Java™, there may similarly also be a problem that the programs in the virtual machine cannot provide external services during garbage collection.

SUMMARY

Embodiments of the present application provide a resource reclamation method. The method can include: determining a memory region corresponding to a target tenant in a heap memory as a target region; and performing resource reclamation on the target region to release the target region.

Embodiments of the present application further provide a resource reclamation apparatus. The apparatus can include a first determination unit configured to determine a memory region corresponding to a target tenant in a heap memory as a target region; and a reclamation unit configured to perform resource reclamation on the target region to release the target region.

The foregoing at least one technical solution employed in the embodiments of the present application can achieve beneficial effects as below.

When resource reclamation is performed on a heap memory, only a memory region corresponding to a target tenant is reclaimed. The target tenant may be one or more tenants in tenants corresponding to the heap memory. Then, memory regions of tenants except the target tenant may not be reclaimed. In this way, threads of the tenants except the target tenant can run normally to provide external services.

BRIEF DESCRIPTION OF THE DRAWINGS

The accompanying drawings described herein are used to provide further understanding of the present application, and constitute a part of the present application. Schematic embodiments of the present application and description thereof are used to explain the present application, and do not constitute improper limitations to the present application.

DETAILED DESCRIPTION

In order to make the objectives, technical solutions and advantages of the present application clearer, the technical solutions of the present application are clearly and completely described below with reference to specific embodiments and corresponding accompanying drawings of the present application. It is apparent that the embodiments described are merely some, instead of all, of the embodiments of the present application. Based on the embodiments in the present application, all other embodiments obtained by those of ordinary skill in the art without creative efforts belong to the protection scope of the present application.

The technical solutions provided in various embodiments of the present application are described in detail in the following with reference to the accompanying drawings.

Figure 1:
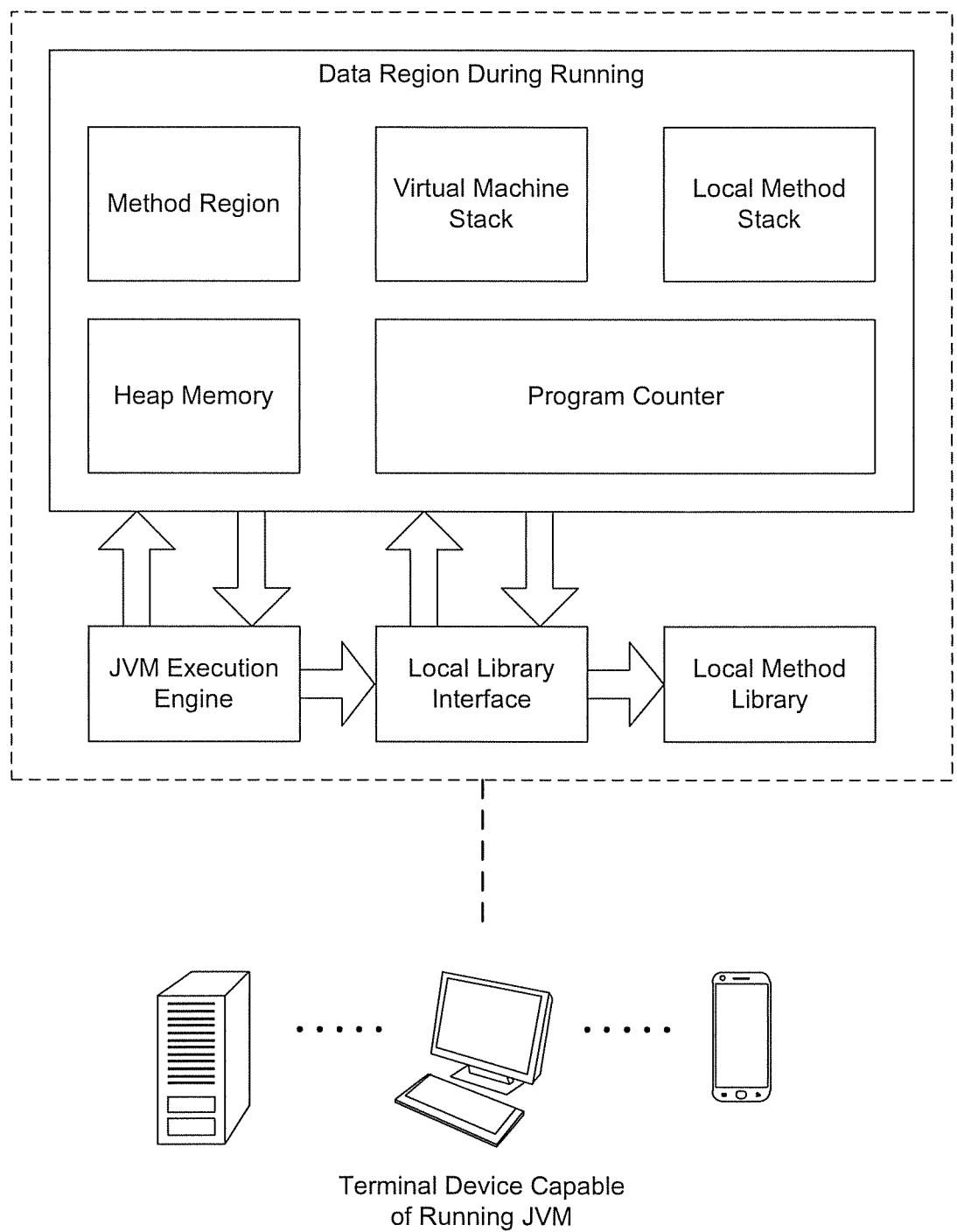
FIG. 1 illustrates a schematic diagram of a relationship between a Java virtual machine and parts of a memory when the virtual machine runs.

Object-oriented software development methods have gone through decades of development so far. In object-oriented software programming languages, Java™ is a representative thereof and can implement an object-oriented theory. A program written in Java may be executed by a JVM. When the JVM executes a Java program, a memory managed by the JVM may be divided into several different data regions. The regions have their own uses. The memory managed by the JVM may include a method region, a virtual machine stack, a local method stack, a Java heap and a program counter. As shown in FIG. 1, various blocks of the memory during running of the JVM are provided.

Under most circumstances, a Java heap (e.g., heap memory) is the largest block in the memory managed by the JVM. The Java heap is a memory region shared by all threads, and can be created when a virtual machine is started. This memory region is used to store object instances, and memory can be allocated to almost all the object instances in the Java heap. To clear unavailable objects in the Java heap to release memory space, garbage collection may then be performed on the Java heap. The garbage collection operation can release the memory resources occupied by the unavailable objects. Therefore, the garbage collection process may also be referred to as resource reclamation.

As discussed above, conventionally, the whole heap memory is reclaimed in the process of resource reclamation. In the process of reclamation, it is necessary to suspend threads of application programs except the program that executes the garbage collection operation. Therefore, changes in object reference or creation of a new object may not be caused by the running of the applications, thereby avoiding problems such as clearing an available object. Therefore, during garbage collection, the application programs in the JVM cannot provide external services. This stage is also referred to as a full suspension stage (i.e., "Stop the World"). When there is a large amount of garbage in the heap, the process of garbage collection can take a long time. Therefore, if there is a service request for an application program in the JVM, a response time of the application program may also be relatively long.

Similarly, some application programs written in other languages may also have the problem that the application programs cannot provide external services during garbage collection. To solve the problem, the present application provides a resource reclamation method for reclaiming resources from tenants.

The tenant may include a set of threads serving a same application logically. The tenant and the application may be two equivalent concepts. As services can be classified according to different service logics, tenants may also be classified from different types. For example, an application program may provide a business service for multiple users at the same time. Then, according to the type of user, a set of threads of the application program serving a same user can be regarded as a tenant.

In embodiments of the present application, upon reception of a service request, is possible to create a tenant in a heap memory according to an application program corresponding to the service request. The tenant can be used to process the service request. Tenants may be created in the heap memory respectively based on service requests of different users to process the service requests of the users. The tenants may share a same system or program component. And isolation of data between users corresponding to the tenants may still be ensured.

When the tenants are stored in the heap memory, objects of different tenants may be stored in different memory regions of the heap memory. Therefore, resource reclamation can be performed on memory regions occupied by some of the users. It is appreciated that the heap memory may be divided into multiple memory regions before the objects of the tenants are stored in the heap memory.

Figure 2:
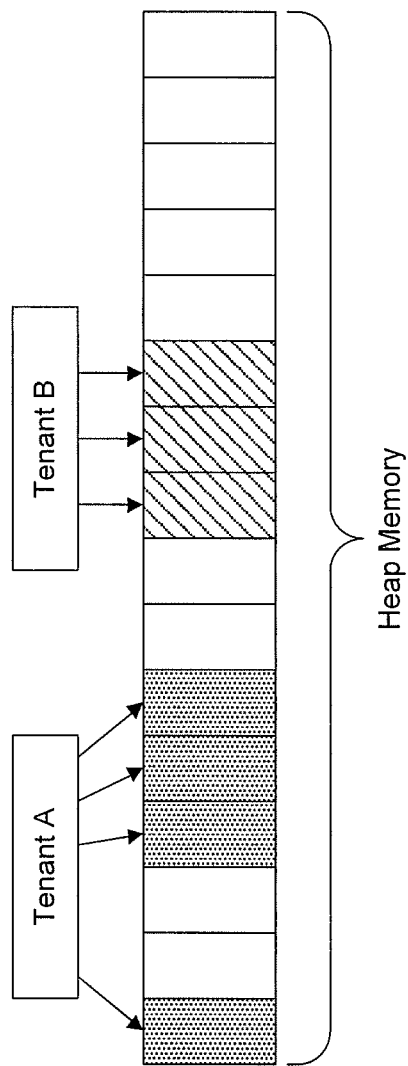
FIG. 2 illustrates a schematic diagram of division of a heap memory according to embodiments of the present application.

Then, a single tenant may own at least one memory region in the heap memory. When a single tenant owns multiple memory regions, the multiple memory regions may be logically continuous or non-continuous memory regions. In the resource reclamation, a divided single region can be a smallest unit. Therefore, a memory region owned by a single tenant in the present application may only store objects of the tenant, so that running of threads of other tenants will not be affected when resource reclamation is performed on a target tenant. As shown in FIG. 2, the heap memory is divided into multiple regions, and a tenant A and a tenant B respectively own memory regions for storing respective objects.

The resource reclamation method according to the present application is described in detail below. The method may be performed by a server or a terminal device. In addition, the method may also be performed by an application program that implements the resource reclamation method according to the present application. For example, the method may be performed by a resource reclamation program or the like. For ease of description, an implementation manner of the method is introduced hereinafter by taking that the method is performed by a resource reclamation program as an example. It may be understood that the method being performed by a resource reclamation program is merely described as an example, and should not be understood as a limitation to the method.

Figure 3:
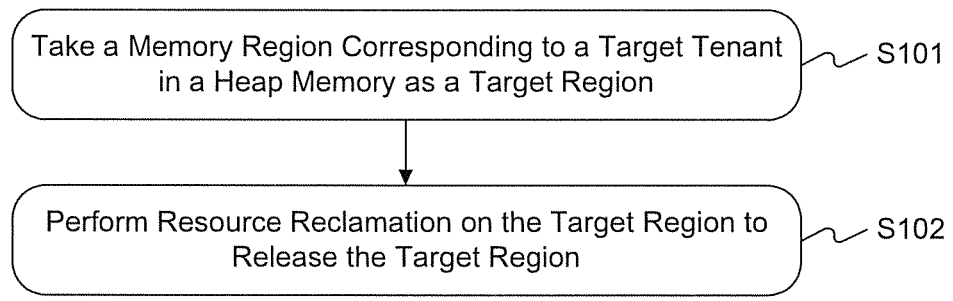
FIG. 3 illustrates a schematic flowchart of implementation of a resource reclamation method according to embodiments of the present application.

FIG. 3 illustrates a schematic flowchart of implementation of a resource reclamation method according to embodiments of the present application. The resource reclamation method can include steps S101 and S102.

In step S101, a memory region corresponding to a target tenant in a heap memory can be determined as a target region.

The target tenant can include one or more tenants in tenants corresponding to the heap memory. For example, the target tenant may be one tenant among all tenants corresponding to the heap memory, or may be some tenants among all tenants corresponding to the heap memory. A manner of determining the target tenant will be described in detail hereinafter with reference to various stages of resource reclamation.

In step S102, resource reclamation can be performed on the target region to release the target region.

When resource reclamation is performed on the target region, a thread of the target tenant may be stopped. In this way, a service of the target tenant cannot proceed. However, because only a memory region corresponding to the target tenant is reclaimed and the target tenant is one or more tenants in tenants corresponding to the heap memory, it is unnecessary to suspend threads of other service tenants. Therefore, service request processing of the other service tenants may not be affected when the memory region corresponding to the target tenant is being cleared.

It should be noted that if there is a reference relationship between the target tenant and other service tenants, the target tenant and the other service tenants may be isolated in the reference relationship. For example, the service tenants may be isolated in the reference relationship, to ensure that the service tenants do not refer to each other. However, some objects that cannot be isolated logically between tenants can be stored in a common memory region as common resources.

Based on the above isolation of the tenants in the heap memory, the heap memory can be divided into a service tenant region and a root tenant region. The service tenant region is used to store objects of service tenants. The service tenants here are tenants for processing service requests, and there is no reference relationship between the service tenants. As the service tenants may be classified according to types of the users, the service tenants may be referred to as user tenants. The root tenant region can be a common memory region for storing objects of a root tenant. The root tenant can provide the service tenants with common resources required during running. For example, the root tenant may include resources, such as a common thread pool in a virtual machine and a shared member variable.

Figure 4:
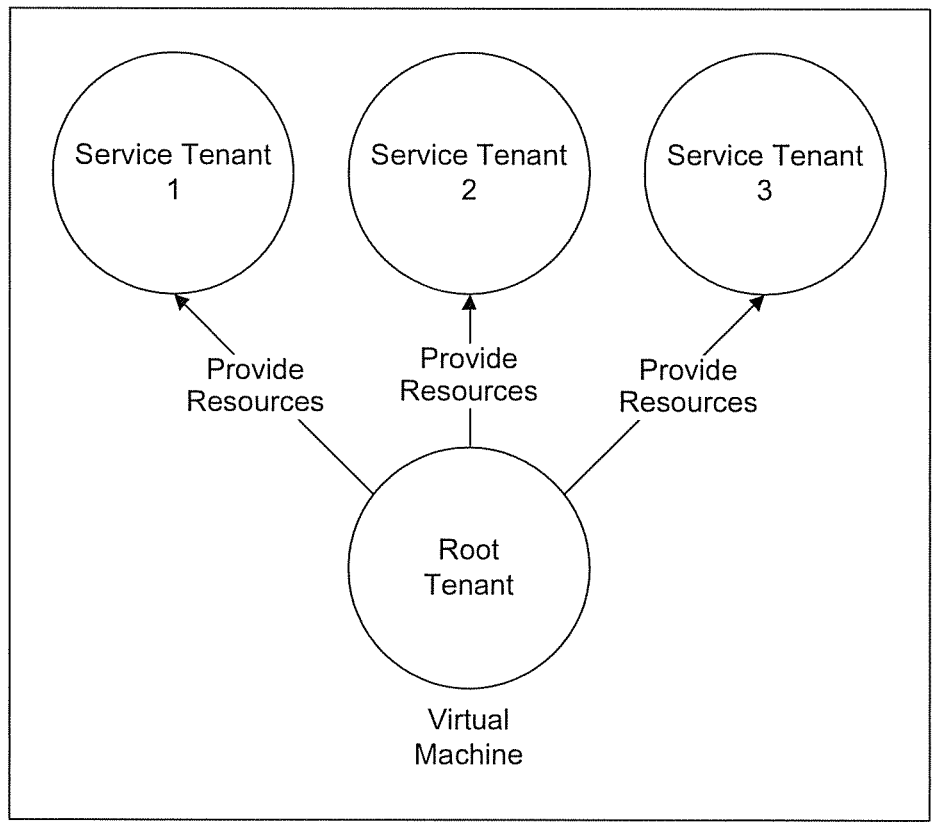
FIG. 4 illustrates a schematic diagram of a relationship between a root tenant and service tenants in a virtual machine according to embodiments of the present application.

FIG. 4 illustrates a schematic diagram of a relationship between a root tenant and service tenants in a virtual machine according to embodiments of the present application. In FIG. 4, a service tenant 1, a service tenant 2, and a service tenant 3 may all refer to objects in the root tenant, and there is no mutual reference relationship among these service tenants.

Figure 5:
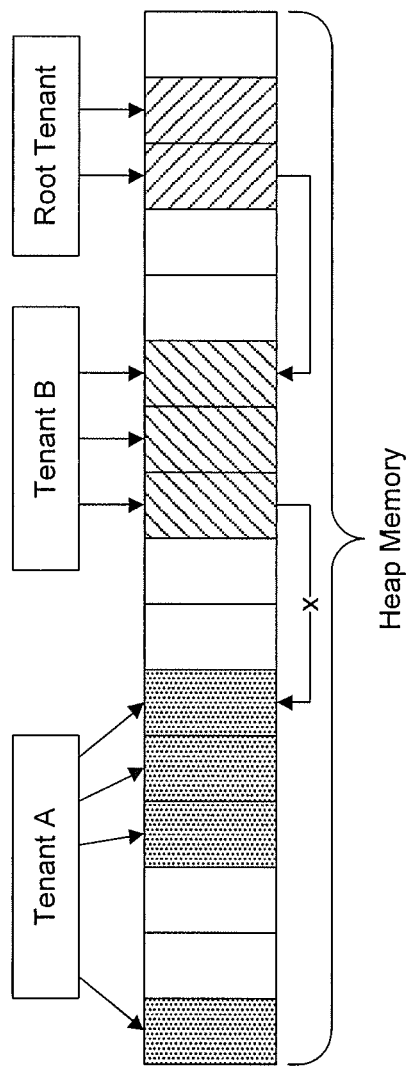
FIG. 5 illustrates a schematic diagram of division of a heap memory according to embodiments of the present application.

FIG. 5 illustrates a schematic diagram of division of a heap memory according to embodiments of the present application. The heap memory is divided into multiple regions. A tenant A and a tenant B respectively own memory regions for storing respective objects. Meanwhile, the root tenant also owns a memory region for storing common resources, and there is no reference relationship between the tenant A and the tenant B. The tenant A and the tenant B may both refer to objects in the root region.

In some embodiments, two independently deployed tenants may be isolated by a ClassLoader. For example, in a Tomcat project of Java™, two independently deployed War tenants do not reference variables of each other due to isolation of the ClassLoader.

When a static variable shared by service tenants is stored in the heap memory, it may be first determined whether the static variable can be isolated between the service tenants in terms of service logic. A ThreadLocal object may also be taken as a static variable. The determination can be made according to a type of the static variable. The type of the static variable can determine whether the static variable can be isolated between the service tenants.

If the static variable can be isolated between the service tenants in terms of service logic, the static variable can be stored in respective service tenant regions of the service tenants. Each of the service tenants referencing the static variable can hold a copy of the static variable, and the copies can be separately stored in respective service tenant regions of the service tenants. If the static variable cannot be isolated between the service tenants, for example, in terms of service logic, the static variable can be stored in the root tenant region. Therefore, the tenants can still share the static variable. Thus, threads of the service tenants can be prevented from accessing a static variable of a target tenant that is performing resource reclamation, thereby avoiding affecting services of the service tenants.

When the static variable can be logically isolated, an operation performed by a service tenant on the static variable may not affect normal operation of services of other service tenants after the isolation. For example, a static variable corresponds to an ID card number of a user. As an ID card number of a user is fixed, an operation performed by a service tenant on the ID card number may not affect normal operation of services of other service tenants. When the static variable cannot be logically isolated, an operation performed by a service tenant on the static variable may affect normal operation of services of other service tenants. For example, a static variable corresponds to a balance of an account. After a service tenant changes a balance of an account, if the static variable corresponding to the balance is isolated between the service tenants, balances of other service tenants may still be balances before the change, which may thus affect normal operation of services of other service tenants.

Figure 6:
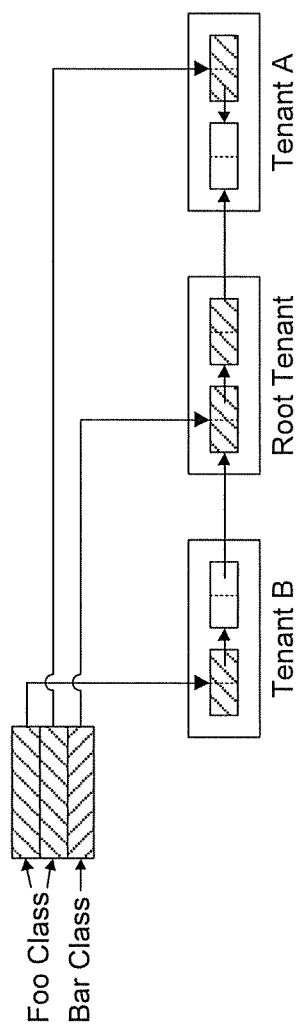
FIG. 6 illustrates a schematic diagram of a static variable storage region according to embodiments of the present application.

For example, as shown in FIG. 6, a variable of a "Foo" class can be logically isolated between service tenants. Pointers of metadata of the "Foo" class are respectively directed to copies of the static variable of the "Foo" class in a tenant A and a tenant B. Therefore, the tenant A and the tenant B both store a static variable of the "Foo" class in respective service tenant regions. Further with reference to FIG. 6, for example, a static variable of a "Bar" class cannot be logically isolated between service tenants. A pointer of metadata of the "Bar" class is directed to a static variable in the root tenant region. Then, during service processing, a thread of the tenant B calls the copy of the static variable of the "Foo" class stored in the service tenant region thereof, a thread of the tenant A calls the copy of the static variable of the "Foo" class stored in the service tenant region thereof, and the tenant A and the tenant B both can call the static variable of the "Bar" class stored in the root tenant region.

It should be noted that, before application runs, threads of all applications can be run in a root tenant context. Therefore, upon reception of a service processing request, an object can be created, according to an application requested by the service request and a tenant corresponding to the tenant. The object is created in a region that the tenant belongs to in a service tenant region, so as to process the service request.

The resource reclamation method according to the present application is described in detail below in combination with four stages of the resource reclamation process in the embodiment of the present application.

The first stage can be a first reclamation stage, which may also be referred to as a Young Generation Collection (Young GC) stage. A heap memory is divided according to survival duration of objects stored in the heap memory, and the heap memory includes a first memory region. The first memory region is a storage region in the heap memory for storing young generation objects. The first memory region can include a new generation object region (e.g., Eden region) for storing new generation objects, as well as a first survivor region (e.g., From region) and a second survivor region (e.g., To region). That is, when a new object is generated, the new object may be stored in the new generation object region. As most of newly generated objects may not be utilized again within a short time after executing one task, a resource reclamation operation may be performed on the first memory region timely. In the present application, when the resource reclamation operation is performed on the first memory region, the resource reclamation operation may also be performed on a memory region corresponding to a target tenant according to a type of tenants.

The first reclamation stage for performing resource reclamation on the first memory region is introduced below.

When it is determined that a storage state in the first memory region meets a first reclamation condition, the first reclamation stage is started. The first reclamation condition may, for example, include the first memory region having no available storage space, the storage amount in the first memory region reaching a set threshold, or the storage amounts of some tenants in the first memory region reaching a set threshold. The first reclamation condition is not limited in the present application.

For ease of description, the target tenant to which the first reclamation stage is directed is referred to as a first target tenant, and the first target tenant includes at least one of a service tenant determined according to space occupancy ranking, a service tenant determined according to sizes of the storage spaces currently occupied by the service tenants in the first memory region, and a service tenant determined according to a preset tenant reclamation order.

For the service tenant determined according to space occupancy ranking, the space occupancy ranking is obtained by sorting service tenants according to a descending order of storage spaces occupied by the service tenants in a first memory region. For example, when the triggering condition for starting the first reclamation stage is the first memory region having no available space, service tenants can be sorted according to a descending order of storage spaces occupied by the service tenants in the first memory region. If resource reclamation needs to be first performed on a memory space corresponding to a service tenant that occupies the most storage space in the first memory region, the service tenant that occupies the most storage space in the first memory region is the first target tenant. When resource reclamation is performed on a memory space corresponding to a service tenant that occupies the second most storage space in the first memory region, the service tenant that occupies the second most storage space in the first memory region is the first target user.

For the service tenant determined according to sizes of the storage spaces currently occupied by the service tenants in the first memory region, for example, when the triggering condition for starting the first reclamation stage is that the storage amount of a single tenant in the first memory region being greater than a certain set threshold, a tenant having a storage amount being greater than the set threshold is the first target tenant.

For the service tenant determined according to a preset tenant reclamation order, the preset tenant reclamation order can be a preset sequence for performing a resource reclamation operation on the memory region corresponding to the service tenants.

That is, a sequence for performing a resource reclamation operation on the memory region corresponding to the service tenants may be preset, and a service tenant that is to perform the resource reclamation operation at the current moment according to the sequence is the first target tenant.

Figure 7:
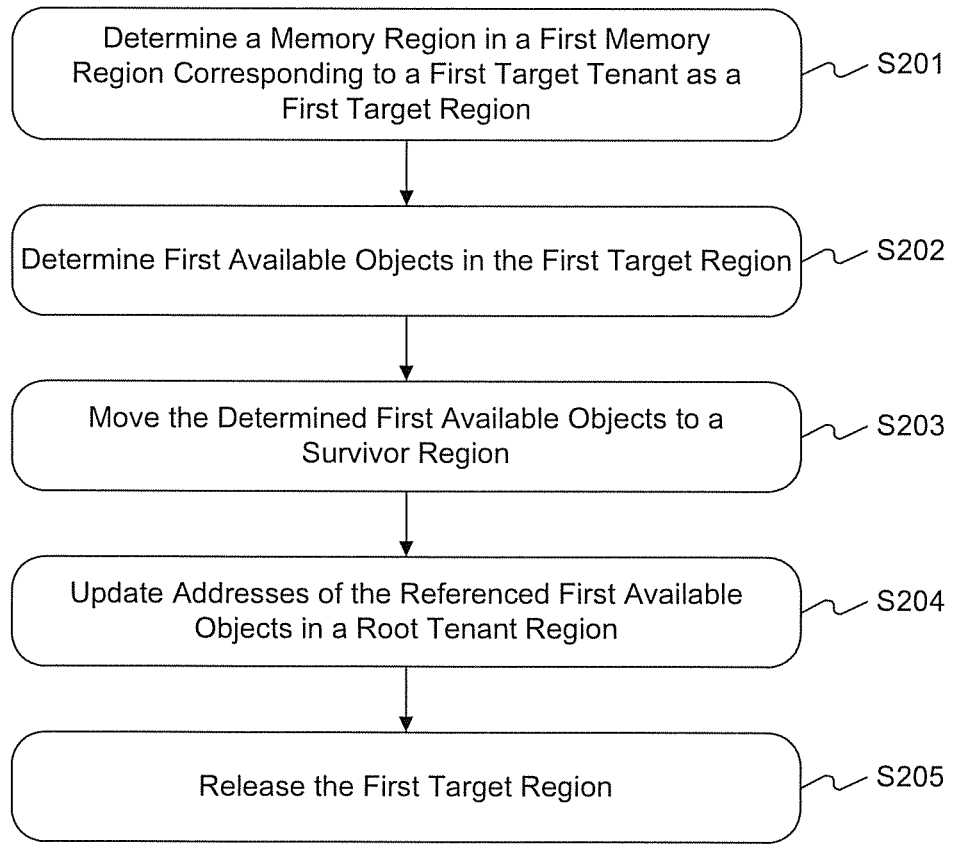
FIG. 7 is a schematic flowchart of a first reclamation stage of a resource reclamation method according to embodiments of the present application.

FIG. 7 is a schematic flowchart of a first reclamation stage of a resource reclamation method according to embodiments of the present application. The first reclamation stage of a resource reclamation method can include S201-S205.

In step S201, a memory region, in the first memory region, corresponding to the first target tenant can be determined as a first target region. That is, resource reclamation is only performed on a memory region corresponding to the first target tenant, and it is unnecessary to suspend threads of service tenants except the first target tenant.

In step S202, first available objects in the first target region can be determined. The so-called available object refers to an object that is being used by a thread. For ease of differentiation from an available object hereinafter, available objects in the first target region are referred to as first available objects. If an object is available, the object is usually being referred by another object. Therefore, an object referenced by a root object (e.g., GC Root) may be considered as an available object.

In the Java™ language, the root object includes: an object referred in a virtual machine stack (e.g., a local variable table in a stack frame), an object referred by a class static attribute in a method region, an object referred by a constant in the method region, an object referred by JNI (e.g., a general Native method) in a local method stack, and an object referred by a root tenant region.

In step S202, as resource reclamation can be performed on the first target region corresponding to the first target tenant, an available object may be determined according to a root object corresponding to the first target tenant among root objects. For example, objects in the first target region that are referred by the root object can be determined as first available objects.

In this process, to prevent a running thread of the root tenant from changing a reference relationship between the root tenant and an object of a target tenant, the thread of the root tenant may be suspended. Thus, the first available objects in the first target region can be determined accurately.

In step S203, the determined first available objects can be removed out of the new generation object region and the first survivor region of the first target region. The first available objects in the first memory region are copied into a second survivor region (e.g., a survivor region named "To"). Destinations of available objects in the first survivor region (e.g., a survivor region named "From") may be determined according to their surviving periods. For example, when objects in the "From" region are still available after going through a preset number of times of the first reclamation stage, the objects can be moved to a second memory region (e.g., "Old" region) described hereinafter. The preset number of times may be, for example, 15.

In step S204, reference addresses in the root tenant region that are specific to the first available objects are updated. As the locations of the first available objects in the memory have changed, reference addresses with which the first available objects are referred by another previously may also be updated, to ensure normal operation of various subsequent services.

In step S205, the new generation object region and the first survivor region in the first target region can be released. As the available objects in the first target region have been transferred to the survivor region, all the objects in the first target region can be cleared away. The new generation object region and the first survivor region in the first target region can be released.

So far, one resource reclamation process for the memory region corresponding to the first target tenant has been completed. In this process, resource reclamation is only performed on the memory region corresponding to the first target tenant. It is only necessary to suspend a thread of the first target tenant, while threads of other service tenants do not need to be suspended, so that service request processing of the other service tenants may not be affected.

Moreover, the present application can reclaim resources only in the memory region corresponding to the first target tenant, and this stage takes a relatively short time for the first target tenant. In this case, the time during which the service of the first target tenant can be affected is also relatively short. Therefore, the experience of a user corresponding to the first target tenant may be improved. Besides, the process does not affect service request processing of other service tenants. Hence, users corresponding to the other service tenants may also have better experience.

Figure 8:
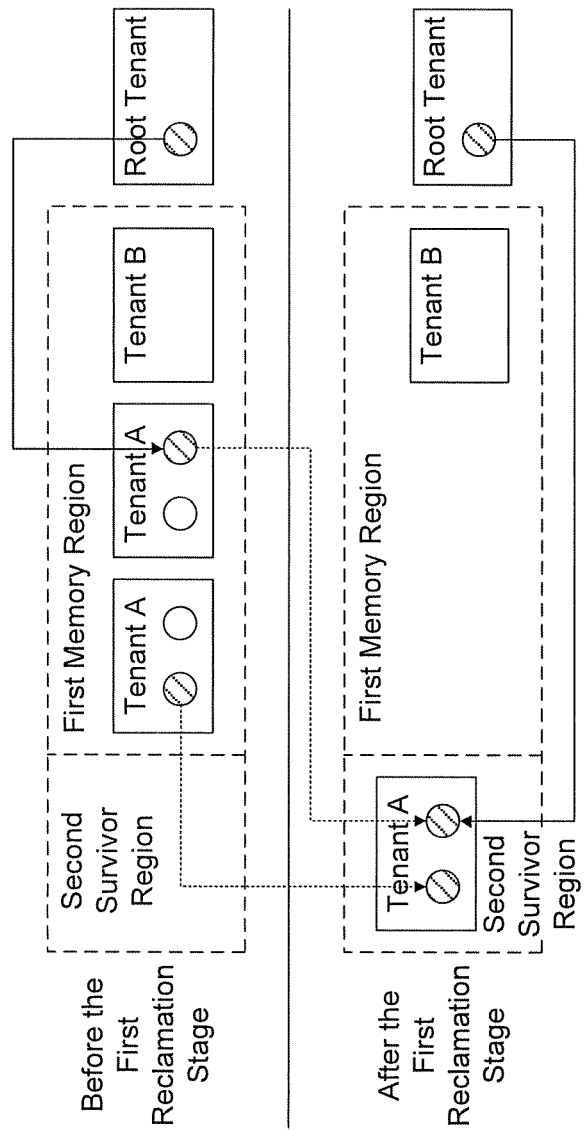
FIG. 8 illustrates a schematic diagram of changes of objects before and after execution of a first reclamation stage according to embodiments of the present application.

FIG. 8 illustrates a schematic diagram of changes of objects before and after execution of a first reclamation stage according to embodiments of the present application. Two surviving objects in tenant A are moved to the second survivor region after going through the first reclamation stage, while tenant B is not affected. At the same time, references in tenant A to the root tenant may also be updated.

It should be noted that at the first reclamation stage, resource reclamation may be simultaneously performed on memory regions corresponding to at least one service tenant, as long as some external services of the virtual machine are not affected. Alternatively, at the first reclamation stage, resource reclamation may be performed on memory regions corresponding to multiple first target tenants in batches. This is not limited in the present application.

The second stage can be a concurrent marking stage. In the concurrent marking stage, the heap memory is divided according to survival duration of objects stored in the heap memory, and the heap memory further includes a second memory region (e.g., "Old" region) for storing old generation objects, which is also referred to as an old generation region. As mentioned in the previous description of the first reclamation stage, the destinations of surviving objects in the survivor region named "From" may be determined according to their surviving periods. For example, when the objects in the "From" region are still available after going through 15 times of the first reclamation stage, the objects are moved to the second memory region.

Resource reclamation on the second memory region is mainly aimed to memory regions in the second memory region. Available objects stored in the memory regions in the second memory region can meet a preset storage condition. Surviving objects of storage regions corresponding to service tenants in the second memory region can be determined during the concurrent marking stage.

After the first target region is released at the first reclamation stage, a tenant memory region corresponding to a target tenant is marked. At this stage, available objects of the target tenant in the first memory region and the second memory region may be determined. For the Java™ virtual machine, at this stage, a thread that performs a marking operation may proceed simultaneously with an application thread. Therefore, the operation may be referred to as a concurrent marking operation. For ease of differentiation, the target tenant on which the concurrent marking stage is performed can be referred to as a second target tenant here. The second target tenant is a service tenant having occupied storage space in the second memory region meeting a preset concurrent marking condition. The concurrent marking condition here may include, for example, occupancy of second storage space corresponding to the service tenant reaching a preset threshold or an occupancy rate of the second storage space corresponding to the service tenant reaching a preset threshold.

For example, for tenant A, ten service storage areas, including four first memory regions and six second memory regions, are allocated to the tenant A in advance. In this case, it may be preset that, when four of the six memory regions have been fully occupied, tenant A is determined as a second target tenant, and a marking operation on a service tenant region corresponding to the tenant A can be triggered.

Figure 9:
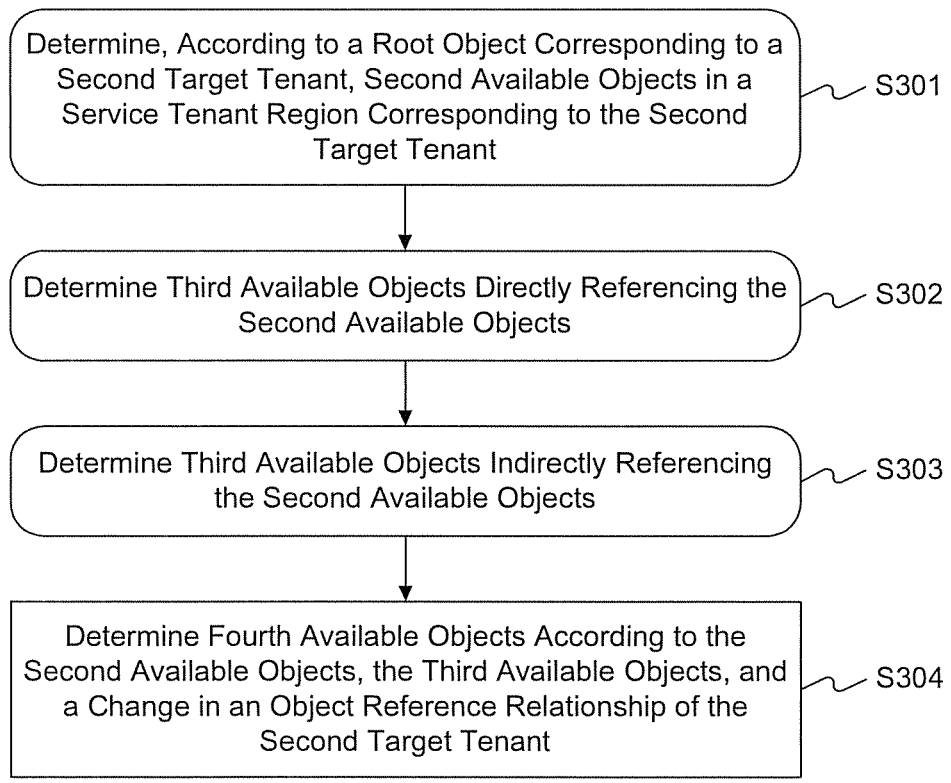
FIG. 9 is a schematic flowchart of implementation of concurrent marking according to embodiments of the present application.

FIG. 9 is a schematic flowchart of implementation of concurrent marking according to embodiments of the present application. The concurrent marking can include S301-S304.

In step S301, second available objects in the service tenant region corresponding to the second target tenant can be determined according to a root object corresponding to the second target tenant. This process is an initial mark process, in which objects in service tenant regions accessible to the root object corresponding to the second target tenant are determined as available objects. For ease of differentiation, the available objects are referred to as second available objects. For a process of determining available objects according to the root object, the related description can be referred with step S202, and details are not repeated herein.

When this step is performed, a thread of the second target tenant and a thread of the root object may be suspended, but threads of service tenants except the second target tenant may not be affected.

In step S302, third available objects directly referencing the second available objects can be determined. This process is a root region scan process. In this process, similarly, only the thread of the second target tenant and the thread of the root object may be suspended, but threads of service tenants except the second target tenant may not be affected.

In step S303, third available objects indirectly referring the second available objects can be determined. This process is a concurrent marking process. A thread that performs this step may be executed concurrently with the thread of the second target tenant, and surviving object information of each region is collected.

As the thread of the second target tenant also runs in this process, changes in reference relationships of the second available objects in the concurrent marking process may be recorded, thereby avoiding incorrectly marking an object whose reference relationship has changed. In some embodiments, the change in the reference relationships of the second available objects in the concurrent marking process may be recorded by using a write barrier.

In step S304, fourth available objects are determined according to a change in an object reference relationship of the second target tenant in the process of determining the third available objects as well as the second available objects and the third available objects. This process is a remark process. In this process, similarly, only the thread of the second target tenant and the thread of the root object may be suspended, but threads of service tenants except the second target tenant may not be affected.

After the fourth available objects are determined, states of the fourth available objects stored in various memory regions of the service tenant region may be obtained. Then, when the service tenant region is reclaimed, a second reclamation stage for the service tenant region can be performed according to the states of the fourth available objects stored in various memory regions of the service tenant region.

The third stage can be a second reclamation stage, referred to as a mixed collection (Mixed GC) stage. At the stage, it is possible to only reclaim the second memory region, and it is also possible to reclaim the first memory region and the second memory region at the same time. This may be determined according to storage conditions of the first memory region and the second memory region.

Figure 10:
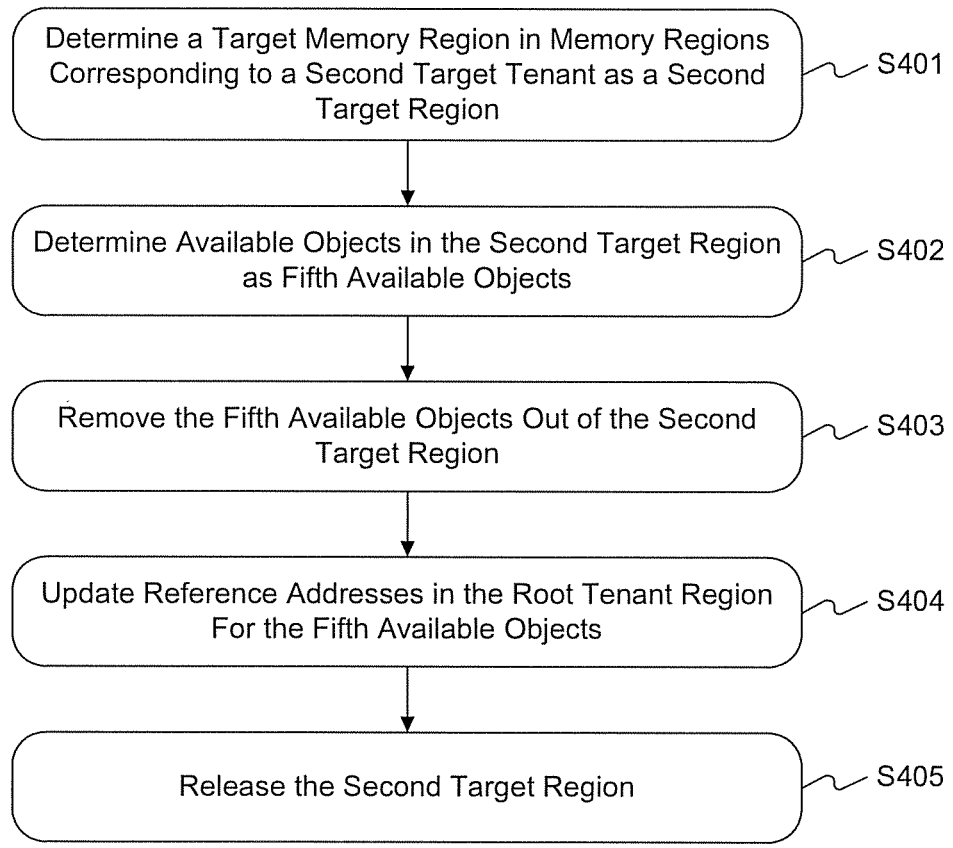
FIG. 10 is a schematic flowchart of a second reclamation stage of a resource reclamation method according to embodiments of the present application.

FIG. 10 is a schematic flowchart of a second reclamation stage of a resource reclamation method according to embodiments of the present application. The second reclamation stage can include steps S401-S405.

In step S401, a target memory region in each memory region corresponding to the second target tenant can be determined as a second target region. The target memory region can be a memory region, in the service tenant region, where the stored fourth available objects meet a preset storage condition. The preset storage condition may include, for example, a ratio of the storage amount occupied by the stored fourth available objects to the total storage amount being less than a set threshold. In this case, it is not necessary to reclaim memory regions in which the ratio of the storage amount occupied by the fourth available objects to the total storage amount is relatively high. For example, in two storage spaces whose occupancy rates are both 100%, if available objects in one storage space occupy 10% of the total storage space and available objects in the other storage space occupy 90% of the total storage space, the memory region where the available objects occupy 10% of the total storage amount of the space may be reclaimed. In this way, more memory space can be released.

During reclamation at the second reclamation stage, a memory region that meets a preset storage condition in the second memory can be reclaimed first. If the number of memory regions that meet the preset storage condition is relatively small (for example, less than a set threshold), the first memory region corresponding to the second target object may be reclaimed then. That is, the first memory region corresponding to the second target object may also be taken as a second target region.

In step S402, fifth available objects in the second target region can be determined. As the second reclamation stage is separately carried out for different tenants, it is also possible to only determine available objects of the second target tenant, i.e., fifth available objects. During determining of the fifth available objects, the available objects can be determined according to a root object corresponding to the second target tenant among root objects.

As the second target region may include a first memory region(e.g., Young region), reference may be made to the related description in step S202 for the process of marking available objects in the first memory region, and details are not repeated herein. The second target region may include second memory regions, and a Remember Set (Rset) of each second memory region can record a reference to the current partition by an object outside the current partition. Therefore, available objects in the second memory region may also be determined according to the Remember Set. Thus, the GC ROOT may further include a Remember Set.

Figure 11:
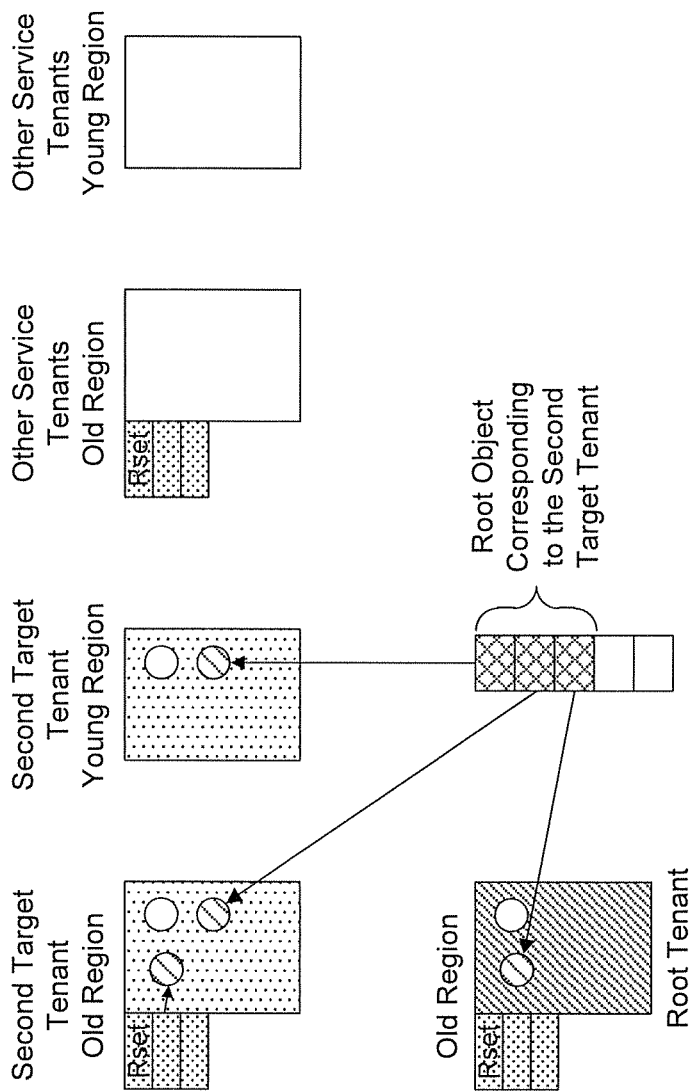
FIG. 11 illustrates a schematic diagram of a relationship between objects when available objects are determined at a second reclamation stage according to embodiments of the present application.

FIG. 11 illustrates a schematic diagram of a relationship between objects when available objects are determined at a second reclamation stage according to embodiments of the present application. All available objects in the Young region of the second target tenant and some or all available objects in the Old region of the second target tenant may be determined according to the root object corresponding to the second target tenant. In addition, available objects in the Old region of the second target tenant may also be determined according to the Remember Set (Rset). In this way, all available objects in the Old region and the Young region of the second target tenant can be determined.

Referring back to FIG. 10, in step S403, the fifth available objects can be removed out of the second target region. In some embodiments, the fifth available objects may be transferred into a new second memory region, and may also be transferred to another region of the heap memory, which is not limited in the present application.

In step S404, reference addresses in the root tenant region for the fifth available objects can be updated. As positions of the fifth available objects in the memory have changed, reference addresses may also be updated to ensure normal operation of various subsequent services. Fifth available objects were previously referred with the reference addresses by another object.

In step S405, the second target region can be released. As the available objects in the second target region have been transferred to another memory region, all objects in the second target region can be cleared away, and the second target region can be released.

So far, one resource reclamation process for the memory region corresponding to the second target tenant has been completed. In this process, resource reclamation is only performed on the memory region corresponding to the second target tenant. It is only necessary to suspend a thread of the second target tenant, while threads of other service tenants do not need to be suspended. Therefore, service request processing of the other service tenants may not be affected.

The present application can reclaim resources only in the memory region corresponding to the second target tenant, and this stage takes a relatively short time for the second target tenant. In this case, the time during which the service of the second target tenant is affected is also relatively short. Therefore, the experience of a user corresponding to the second target tenant may be better. Besides, the process does not affect service request processing of other service tenants. Hence, users corresponding to the other service tenants may also have better experience.

The fourth stage can be a global reclamation stage. For the heap memory, frequent creation or deletion of objects may lead to discontinuity of the memory space, resulting in lots of fragments in the memory space. This may reduce an object writing/reading speed, thus affecting the running efficiency of a program. Therefore, to improve the running efficiency of the program, resource reclamation may be performed on the entire heap memory under some circumstances. For example, resource reclamation may be performed on the entire heap memory when it is detected that a memory fragmentation degree of the root tenant region exceeds a set fragmentation threshold. This reclamation performed on the entire heap memory can be part of the fourth stage known as a global reclamation stage.

When resource reclamation of this stage is performed on the entire heap memory, threads of all tenants may be suspended. Then, after available objects in the entire heap memory are determined and transferred to a certain storage space, the storage space of the entire heap memory can be released. It should be noted that, in the present application, when resource reclamation is performed to release regions of the heap memory, defragmentation may be performed to eliminate the problem of fragmentation of the memory space. In the process of global reclamation, the available objects may be transferred to a certain memory region in the heap memory, and then other memory regions in the heap memory may be released.

Although threads of all tenants may be suspended at the global reclamation stage, the workload of the global reclamation stage may not be too heavy due to the previous resource reclamation at the first reclamation stage and the second reclamation stage. Thus, the global reclamation stage may not take a long time. Moreover, the global reclamation stage is only carried out when a memory fragmentation degree of the root tenant region exceeds a set fragmentation threshold, and may not be carried out frequently. Therefore, it may not lead to the problem that application programs cannot provide external services within a long time.

To facilitate understanding of execution of various threads at the foregoing various stages of the resource reclamation method according to the present application, execution of a resource reclamation thread and application threads at the various stages is described in detail in a unified way below.

Figure 12:
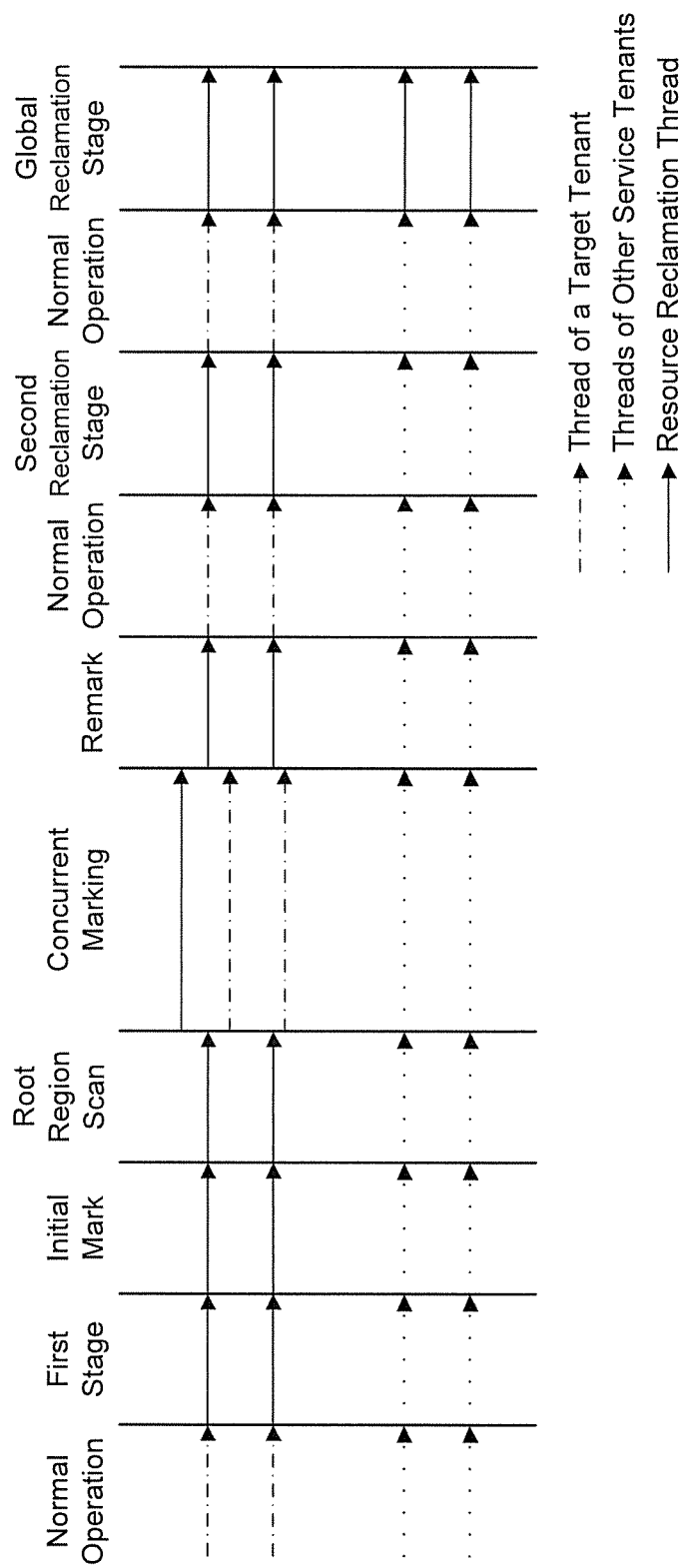
FIG. 12 illustrates a schematic diagram of thread execution states of a resource reclamation method at various stages according to embodiments of the present application.

FIG. 12 illustrates a schematic diagram of thread execution states of a resource reclamation method at various stages according to embodiments of the present application. In FIG. 12, a first kind of lines (i.e., the dot dash lines) is used to represent a thread corresponding to a target tenant, a second kind of lines (i.e., the dot lines) is used to represent threads of service tenants except the target tenant, and a third kind of lines (i.e., solid lines) is used to represent a resource reclamation thread. For example, a thread within a certain stage indicates the thread is being executed in that stage. It can be seen from FIG. 12 that, at all stages except for the global reclamation stage, the threads of other service tenants (i.e., the dot lines) are in an execution state for reclaiming the thread of the target tenant.

In the resource reclamation method according to embodiments of the present application, reclamation may be performed by taking only a memory region corresponding to a target tenant as a target region during resource reclamation, and memory regions of tenants except the target tenant may not be reclaimed. Therefore, threads of tenants except the target tenant can run normally to provide external services. Moreover, as resource reclamation is performed only for the target tenant, a suspension time of the thread of the target tenant may be relatively short and a response to a service may also be relatively fast. If the service is a service for users, the users can have better experience.

Figure 13:
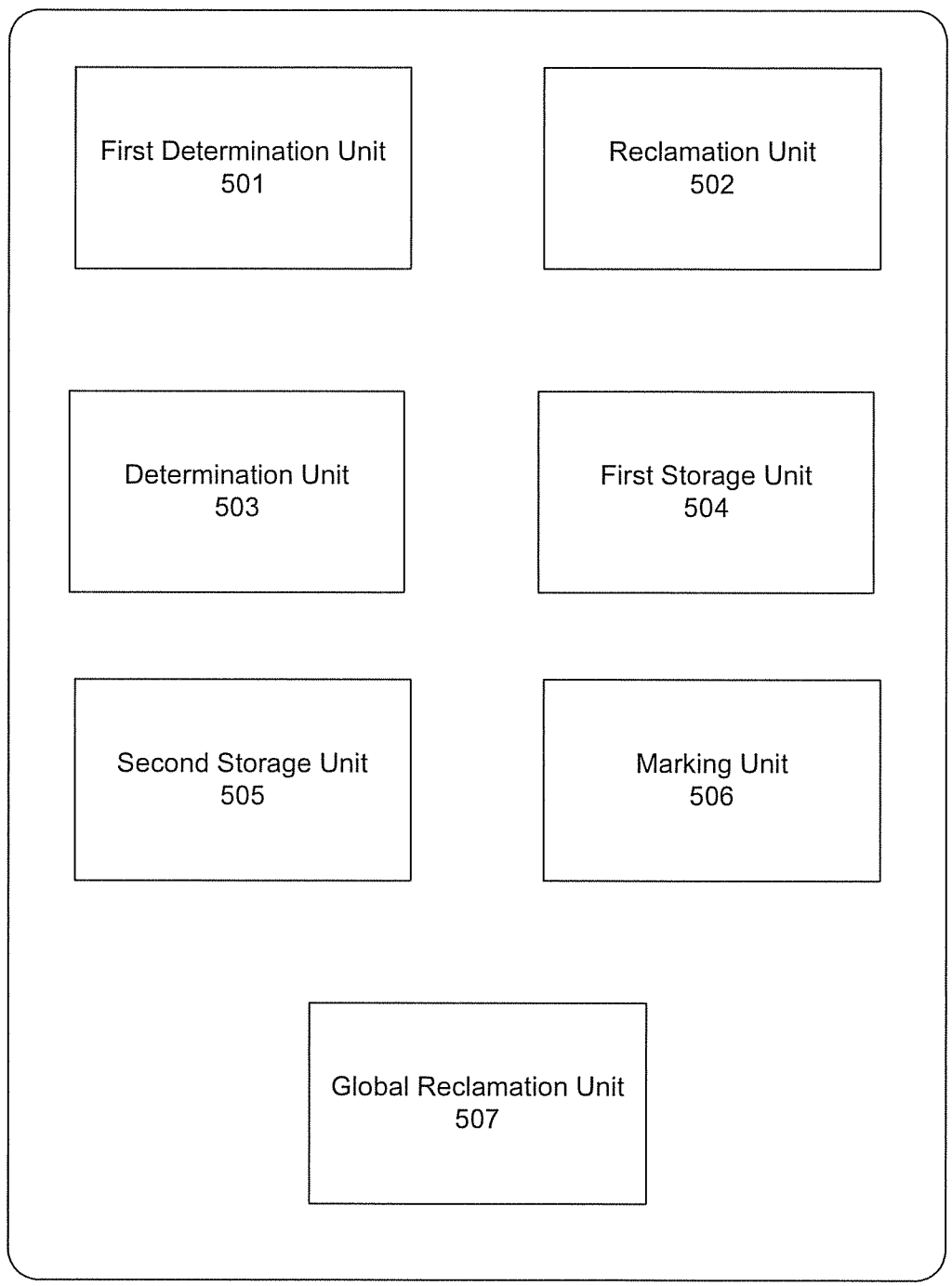
FIG. 13 illustrates a exemplary structural schematic diagram of a resource reclamation apparatus according to embodiments of the present application.

Embodiments of the present application further provide a resource reclamation apparatus. FIG. 13 illustrates an exemplary structural schematic diagram of a resource reclamation apparatus 500 according to embodiments of the present application. Resource reclamation apparatus 500 can include a first determination unit 501 and a reclamation unit 502.

First determination unit 501 can be configured to determine a memory region corresponding to a target tenant in a heap memory as a target region, the target tenant being one or more tenants in tenants corresponding to the heap memory.

Reclamation unit 502 can be configured to perform resource reclamation on the target region to release the target region.

In some embodiments, first determination unit 501 can determine a memory region corresponding to a target tenant in a heap memory as a target region. The target tenant can include one or more tenants in tenants corresponding to the heap memory. Then, reclamation unit 502 can perform resource reclamation on the target region to release the target region. Therefore, in the resource reclamation process, only a thread of the target tenant is suspended while threads of other tenants are not affected. Thus, other tenants can still provide external services.

In some embodiments of the present application, to avoid mutual reference between the target tenant and other tenants from affecting normal operation of services of other tenants, the target tenant can include a service tenant. The service tenant is a tenant for processing a service request. There is no reference relationship between the target tenant and other service tenants.

In some embodiments of the present application, a determination unit 503 and a first storage unit 504 can be configured to remove the reference relationship between the target tenant and other service tenants.

Determination unit 503 can be configured to determine, in response to a static variable shared by service tenants being stored in the heap memory, whether the static variable can be isolated between the service tenants in terms of service logic.

First storage unit 504 can be configured to store the static variable in respective service tenant regions of the service tenants in response to the determination that the static variable can be isolated between the service tenants in terms of service logic.

In some embodiments of the present application, a second storage unit 505 can be configured to store the static variable in a root tenant region of the heap memory in response to the determination that the static variable cannot be isolated between the service tenants in terms of service logic. The root tenant region can store objects of a root tenant, and the root tenant can provide the service tenants with resources required during running.

In some embodiments, the target tenant includes a first target tenant. The first target tenant includes at least one of the service tenants as below.

For example, the first target tenant can include a service tenant determined according to space occupancy ranking. The space occupancy ranking can be obtained by sorting service tenants according to a descending order of storage spaces occupied by the service tenants in a first memory region. The first memory region can be, in the heap memory, a storage region for storing young generation objects.

For example, the first target tenant can include a service tenant determined according to sizes of the storage spaces currently occupied by the service tenants in the first memory region.

For example, the first target tenant can include a service tenant determined according to a preset tenant reclamation order. The preset tenant reclamation order can be a preset sequence for performing a resource reclamation operation on the regions corresponding to the service tenants in the first memory region.

In some embodiments, first determination unit 501 can be configured to determine, as a first target region, a memory region corresponding to the first target tenant in the first memory region. The first target region can include a new generation object region and a first survivor region.

Reclamation unit 502 can be configured to determine first available objects in the first target region. Reclamation unit 502 can be further configured to remove the determined first available objects out of the new generation object region and the first survivor region of the first target region. Reclamation unit 502 can also be configured to update reference addresses in the root tenant region for the first available objects. Reclamation unit 502 can be further configured to release the new generation object region and the first survivor region in the first target region.

In some embodiments, reclamation unit 502 can be configured to determine a root object corresponding to the first target tenant, and determine objects referred by the root object in the first target region as the first available objects.

In some embodiments, the heap memory can be divided according to survival duration of stored objects. The heap memory further includes a second memory region for storing old generation objects.

Apparatus 500 of FIG. 13 can further include a marking unit 506. Marking unit 506 can be configured to mark the tenant memory region corresponding to a second target tenant after the new generation object region and the first survivor region in the first target region are released. The second target tenant can be a service tenant having occupied storage space in the second memory region meeting a preset concurrent marking condition.

In some embodiments, marking unit 506 can include a first marking unit, a second marking unit, and a third marking unit.

First marking unit can be configured to determine second available objects in the service tenant region corresponding to the second target tenant according to a root object corresponding to the second target tenant.

Second marking unit can be configured to determine third available objects directly referencing and indirectly referencing the second available objects.

Third marking unit can be configured to determine fourth available objects according to the second available objects, the third available objects, and a change in an object reference relationship of the second target tenant in the process of determining the third available objects.

In some embodiments, first determination unit 501 can be configured to determine a target memory region in each memory region corresponding to the second target tenant as a second target region. The target memory region can be a memory region, in the service tenant region, where the stored fourth available objects meet a preset storage condition.

Reclamation unit 502 can be configured to determine available objects in the second target region as fifth available objects. Reclamation unit 502 can be further configured to remove the fifth available objects out of the second target region. Reclamation unit 502 can be also configured to update reference addresses in the root tenant region for the fifth available objects, and release the second target region.

In some embodiments, apparatus 500 can further include: a global reclamation unit 507. Global reclamation unit 507 can be configured to perform resource reclamation on the whole heap memory when a memory fragmentation degree of the root tenant region exceeds a set fragmentation threshold.

In the resource reclamation apparatus according to embodiments of the present application, memory regions of tenants except the target tenant may not be reclaimed. Therefore, threads of tenants except the target tenant can continue to provide external services.

Moreover, the present application can reclaim resources only in the memory region corresponding to the target tenant, and this stage takes a relatively short time for the target tenant. Thus, the time during which the service of the target tenant is affected is also relatively short. Therefore, the experience of a user corresponding to the target tenant may be better. Besides, the process does not affect service request processing of other service tenants. Hence, users corresponding to the other service tenants may also have better experiences.

It should be noted that, in the 1990s, an improvement on a technology may be obviously distinguished as an improvement on hardware (for example, an improvement on a circuit structure such as a diode, a transistor, and a switch) or an improvement on software (an improvement on a method procedure). However, with the development of technologies, many improvements of method procedures at present may be considered as direct improvements on hardware circuit structures. Almost all designers program the improved method procedures into hardware circuits to obtain corresponding hardware circuit structures. Therefore, it is improper to assume that the improvement of a method procedure cannot be implemented by using a hardware entity module. For example, a Programmable Logic Device (PLD) (for example, a Field Programmable Gate Array (FPGA)) is such an integrated circuit that its logic functions are determined by devices programmed by a user. Designers program by themselves to "integrate" a digital system into a piece of PLD, without the need to ask a chip manufacturer to design and manufacture a dedicated integrated circuit chip. Moreover, at present, the programming is mostly implemented by using logic compiler software, instead of manually manufacturing an integrated circuit chip. The logic compiler software is similar to a software complier used for developing and writing a program, and original code before compiling also needs to be written by using a specific programming language, which is referred to as a Hardware Description Language (HDL). There is not just one, but are many types of HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL), among which Very-High-Speed Integrated Circuit Hardware Description Language (VHDL) and Verilog are most commonly used now. Those skilled in the art should also know that a hardware circuit for implementing the logic method procedure may be easily obtained by slightly logically programming the method procedure using the above several hardware description languages and programming it into an integrated circuit.

A controller may be implemented in any suitable manner. For example, the controller may be in the form of, for example, a microprocessor or a processor and a computer readable medium storing computer readable program code (for example, software or firmware) executable by the (micro)processor, a logic gate, a switch, an Application Specific Integrated Circuit (ASIC), a programmable logic controller, and an embedded micro-controller. Examples of the controller include, but are not limited to, the following micro-controllers: ARC 625D, Atmel AT91SAM, Microchip PIC18F26K20, and Silicone Labs C8051F320. A memory controller may also be implemented as a part of control logic of a memory. Those skilled in the art also know that the controller may be implemented by using pure computer readable program code, and in addition, the method steps may be logically programmed to enable the controller to implement the same function in the form of a logic gate, a switch, an application specific integrated circuit, a programmable logic controller and an embedded microcontroller. Therefore, this type of controller may be considered as a hardware component, and apparatuses included therein for implementing various functions may also be considered as structures inside the hardware component. Or, the apparatuses used for implementing various functions may even be considered as both software modules for implementing the method and structures inside the hardware component.

The system, apparatus, module or unit illustrated in the above embodiments may be implemented by using a computer chip or an entity, or a product having a certain function. A typical implementation device is a computer. The computer may be, for example, a personal computer, a laptop computer, a cell phone, a camera phone, a smart phone, a personal digital assistant, a media player, a navigation device, an e-mail device, a game console, a tablet computer, a wearable device, or a combination of any of the devices.

For ease of description, when the apparatus is described, it is divided into various units in terms of functions for respective description. Definitely, when the present application is implemented, the functions of the units may be implemented in the same or multiple software and/or hardware.

Those skilled in the art should understand that embodiments of the present application may be provided as a method, a system, or a computer program product. Therefore, the present invention may be implemented as a complete hardware embodiment, a complete software embodiment, or an embodiment combining software and hardware. Moreover, the present invention may be in the form of a computer program product implemented on one or more computer usable storage media (including, but not limited to, a magnetic disk memory, a CD-ROM, an optical memory, and the like) including computer usable program code.

The present application is described with reference to flowcharts and/or block diagrams of the method, device (system) and computer program product according to the embodiments of the present invention. It should be understood that a computer program instruction may be used to implement each process and/or block in the flowcharts and/or block diagrams and combinations of processes and/or blocks in the flowcharts and/or block diagrams. The computer program instructions may be provided to a computer, an embedded processor, or a processor of another programmable data processing device to generate a machine, such that the computer or the processor of another programmable data processing device executes an instruction to generate an apparatus configured to implement functions designated in one or more processes in a flowchart and/or one or more blocks in a block diagram.

The computer program instructions may also be stored in a computer readable storage that can guide the computer or another programmable data processing device to work in a specific manner, such that the instruction stored in the computer readable storage generates an article of manufacture including an instruction apparatus, and the instruction apparatus implements functions designated by one or more processes in a flowchart and/or one or more blocks in a block diagram.

The computer program instructions may also be loaded in the computer or another programmable data processing device, such that a series of operation steps are executed on the computer or another programmable device to generate computer implemented processing, and therefore, the instruction executed in the computer or another programmable device provides steps for implementing functions designated in one or more processes in a flowchart and/or one or more blocks in a block diagram.

In a typical configuration, the computing device includes one or more processors (CPU), an input/output interface, a network interface, and a memory.

The memory may include a volatile memory, a random access memory (RAM), and/or a non-volatile memory or the like in a computer readable medium, for example, a read-only memory (ROM) or a flash RAM. The memory is an example of the computer readable medium.

The computer readable medium includes non-volatile and volatile media as well as movable and non-movable media, and can implement information storage by means of any method or technology. Information may be a computer readable instruction, a data structure, and a module of a program or other data. A storage medium of a computer includes, for example, but is not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to the computing device. According to the definition herein, the computer readable medium does not include transitory media, such as modulated data signals and carriers.

It should be further noted that the terms "include", "comprise" or other variations thereof are intended to cover non-exclusive inclusion, so that a process, method, commodity or device including a series of elements not only includes the elements, but also includes other elements not clearly listed, or further includes inherent elements of the process, method, commodity or device. In the absence of more limitations, an element defined by "including a/an . . . " does not exclude that the process, method, commodity or device including the element further has other identical elements.

The present application may be described in a common context of a computer executable instruction executed by a computer, for example, a program module. Generally, the program module includes a routine, a program, an object, an assembly, a data structure, and the like for executing a specific task or implementing a specific abstract data type. The present application may also be practiced in distributed computing environments, and in the distributed computer environments, a task is executed by using remote processing devices connected through a communications network. In the distributed computer environment, the program module may be located in a local and remote computer storage media including a storage device.

The embodiments in the specification are described progressively, identical or similar parts of the embodiments may be obtained with reference to each other, and each embodiment emphasizes a part different from other embodiments. Especially, the system embodiment is basically similar to the method embodiment, so it is described simply. For related parts, refer to the description of the parts in the method embodiment.

The above description is merely embodiments of the present application, which are not intended to limit the present application. For those skilled in the art, the present application may have various modifications and changes. Any modification, equivalent replacement, improvement and the like made within the spirit and principle of the present application should all be included in the scope of the claims of the present application.

What is claimed is:

1. A resource reclamation method, comprising:
   determining a memory region corresponding to a target tenant included by a heap memory as a target region comprising:
      determining a memory region, in a first memory region for storing young generation objects in the heap memory, corresponding to a first target tenant included in the target tenant as a first target region, wherein the first target region comprises a new generation object region and a first survivor region, the heap memory further includes at least one other memory region corresponding to at least one other service tenant configured for processing at least one service request, and there is no reference relationship between the target tenant and the at least one other service tenant; and
   performing resource reclamation on the target region to release the target region comprising:
      determining first available objects in the first target region,
      removing the determined first available objects from the new generation object region and the first survivor region of the first target region,
      updating reference addresses in a root tenant region for the first available objects, and releasing the new generation object region and the first survivor region in the first target region, wherein the resource reclamation on the target region is performed while the at least one service request by the at least one other service tenant is processed and a process of a service request by the target tenant is suspended.

2. The method according to claim 1, wherein the at least one other service tenant share a static variable with the target tenant, and the method further comprises:

determining, in response to the static variable being stored in the heap memory, whether the static variable can be isolated between the at least one other service tenant and the target tenant; and in response to the determination that the static variable can be isolated between the at least one other service tenant and the target tenant, storing a copy of the static variable in each service tenant region of the at least one other service tenant and the target tenant.

3. The method according to claim 2, further comprising:

in response to the determination that the static variable cannot be isolated between the at least one other service tenant and the target tenant, storing the static variable in the root tenant region of the heap memory, wherein the root tenant region stores objects of a root tenant, and the root tenant provides the at least one other service tenant and the target tenant with resources for running.

4. The method according to claim 1, wherein the first target tenant is determined according to space occupancy ranking, the space occupancy ranking being obtained by sorting service tenants according to a descending order of storage spaces occupied by the service tenants in the first memory region; or the first target tenant is determined according to sizes of the storage spaces currently occupied by service tenants in the first memory region; or the first target tenant is determined according to a preset tenant reclamation order, the preset tenant reclamation order being a preset sequence for performing a resource reclamation operation on the regions, in the first memory region, corresponding to the service tenants.

5. The method according to claim 1, wherein determining first available objects in the first target region further comprises:

determining a root object corresponding to the first target tenant; and determining objects, in the first target region, referred by the root object as the first available objects.

6. The method according to claim 5, wherein the heap memory further comprises a second memory region for storing old generation objects; and after releasing the new generation object region and the first survivor region in the first target region, the method further comprises:

marking the tenant memory region corresponding to a second target tenant, the second target tenant being a service tenant having occupied storage space in the second memory region meeting a preset concurrent marking condition.

7. The method according to claim 6, wherein marking the tenant memory region corresponding to the second target tenant further comprises:

determining, according to a root object corresponding to the second target tenant, second available objects in the service tenant region corresponding to the second target tenant;

determining third available objects referring the second available objects; and determining fourth available objects according to the second available objects, the third available objects, and a change in an object reference relationship of the second target tenant in the process of determining the third available objects.

8. The method according to claim 7, wherein determining the memory region corresponding to the target tenant in the heap memory as the target region further comprises:

determining a target memory region in each memory region corresponding to the second target tenant as a second target region, the target memory region being a memory region, in the service tenant region, where the stored fourth available objects meet a preset storage condition; and performing resource reclamation on the target region further comprises:

determining available objects in the second target region as fifth available objects;

removing the fifth available objects out of the second target region;

updating reference addresses in the root tenant region for the fifth available objects; and releasing the second target region.

9. The method according to claim 8, further comprising:

performing resource reclamation on the heap memory in response to a memory fragmentation degree of the root tenant region exceeding a fragmentation threshold.

10. A resource reclamation apparatus, comprising:

a memory storing a set of instructions; and one or more processors configured to execute the set of instructions to cause the apparatus to:

determine a memory region corresponding to a target tenant in a heap memory as a target region comprising:

determine a memory region, in a first memory region for storing young generation objects in the heap memory, corresponding to a first target tenant included in the target tenant as a first target region, wherein the first target region comprises a new generation object region and a first survivor region, the heap memory further includes at least one other memory region corresponding to at least one other service tenant configured for processing at least one service request, and there is no reference relationship between the target tenant and the at least one other service tenant; and perform resource reclamation on the target region to release the target region comprising:

determine first available objects in the first target region, remove the determined first available objects from the new generation object region and the first survivor region of the first target region, update reference addresses in a root tenant region for the first available objects, and release the new generation object region and the first survivor region in the first target region, wherein the resource reclamation on the target region is performed while the at least one service request by the at least one other service tenant is processed and a process of a service request by the target tenant is suspended.

11. The apparatus according to claim 10, wherein the at least one service tenant shares a static variable with the target tenant, and the one or more processors are configured to execute the set of instructions to cause the apparatus to further:

determine, in response to the static variable being stored in the heap memory, whether the static variable can be isolated between the at least one service tenant and the target tenant; and store a copy of the static variable in each service tenant region of the at least one service tenant and the target tenant in response to the determination that the static variable can be isolated between the at least one service tenant and the target tenant.

12. The apparatus according to claim 11, wherein the one or more processors are configured to execute the set of instructions to cause the apparatus to further:

store the static variable in the root tenant region of the heap memory in response to the determination that the static variable cannot be isolated between the at least one service tenant and the target tenant, wherein the root tenant region stores objects of a root tenant, and the root tenant provides the service tenants with resources for running.

13. A non-transitory computer readable medium that stores a set of instructions that is executable by at least one processor of an electronic device to cause the device to perform a resource reclamation method, the method comprising:

determining a memory region corresponding to a target tenant included by a heap memory as a target region comprising:

determining a memory region, in a first memory region for storing young generation objects in the heap memory, corresponding to a first target tenant included in the target tenant as a first target region, wherein the first target region comprises a new generation object region and a first survivor region, the heap memory further includes at least one other memory region corresponding to at least one other service tenant configured for processing at least one service request, and there is no reference relationship between the target tenant and the at least one other service tenant; and performing resource reclamation on the target region to release the target regioncomprising:

determining first available objects in the first target region, removing the determined first available objects from the new generation object region and the first survivor region of the first target region, updating reference addresses in a root tenant region for the first available objects, and releasing the new generation object region and the first survivor region in the first target region, wherein the resource reclamation on the target region is performed while the at least one service request by the at least one other service tenant is processed and a process of a service request by the target tenant is suspended.

14. The non-transitory computer readable medium according to claim 13, wherein the at least one other service tenant share a static variable with the target tenant, and the set of instructions is executable by the at least one processor of the device to cause the device to further perform:

determining, in response to the static variable being stored in the heap memory, whether the static variable can be isolated between the at least one other service tenant and the target tenant; and in response to the determination that the static variable can be isolated between the at least one other service tenant and the target tenant, storing a copy of the static variable in each service tenant region of the at least one other service tenant and the target tenant.

15. The non-transitory computer readable medium according to claim 14, wherein the set of instructions is executable by the at least one processor of the device to cause the device to further perform:

in response to the determination that the static variable cannot be isolated between the at least one other service tenant and the target tenant, storing the static variable in the root tenant region of the heap memory, wherein the root tenant region stores objects of a root tenant, and the root tenant provides the at least one other service tenant and the target tenant with resources for running.

\* \* \* \* \*